(No Model.) 2 Sheets—Sheet 2.
J. H. FOWLES.
CULTIVATOR, HARROW, AND COTTON CHOPPER.
No. 363,999. Patented May 31, 1887.
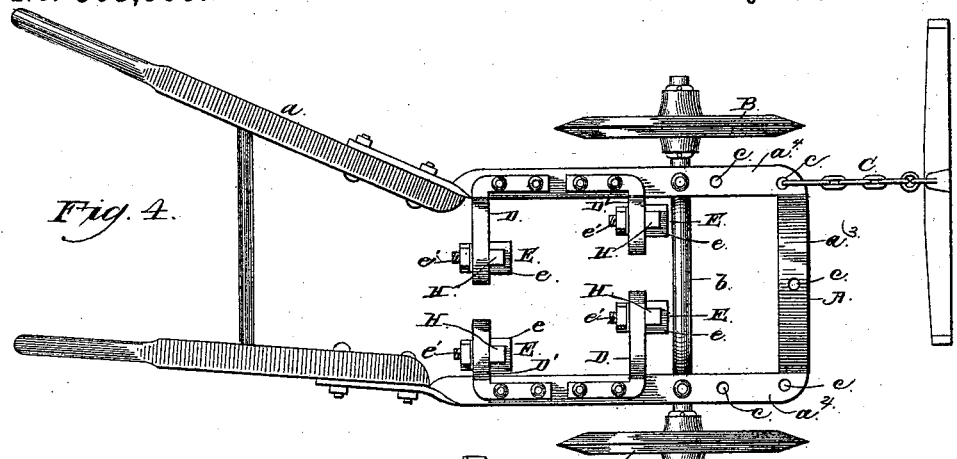
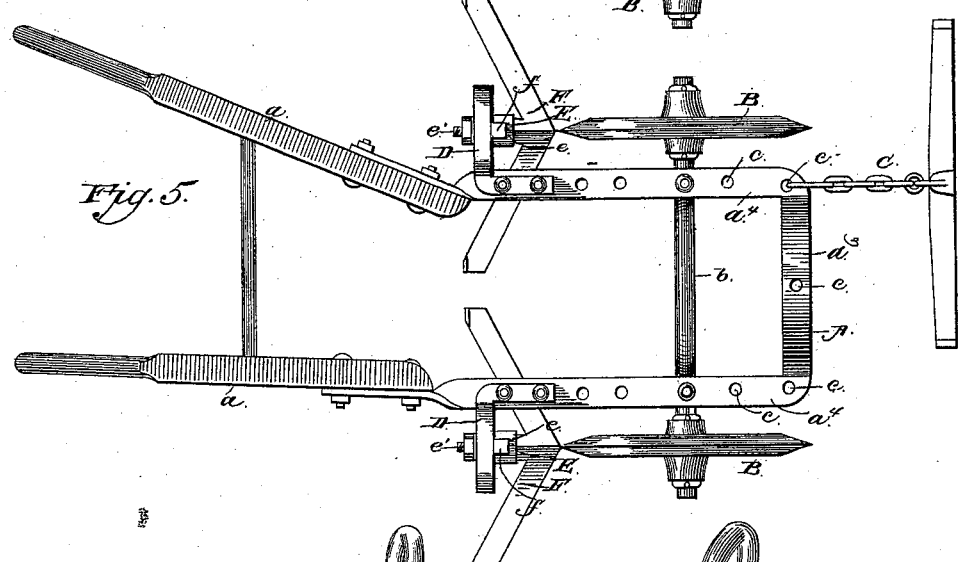
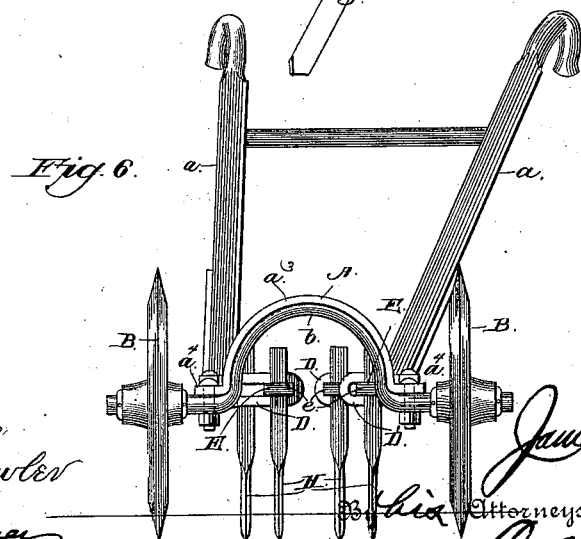
Witnesses
M. E. Fowler
J. W. Garner
Inventor
James H. Fowles
by his Attorneys

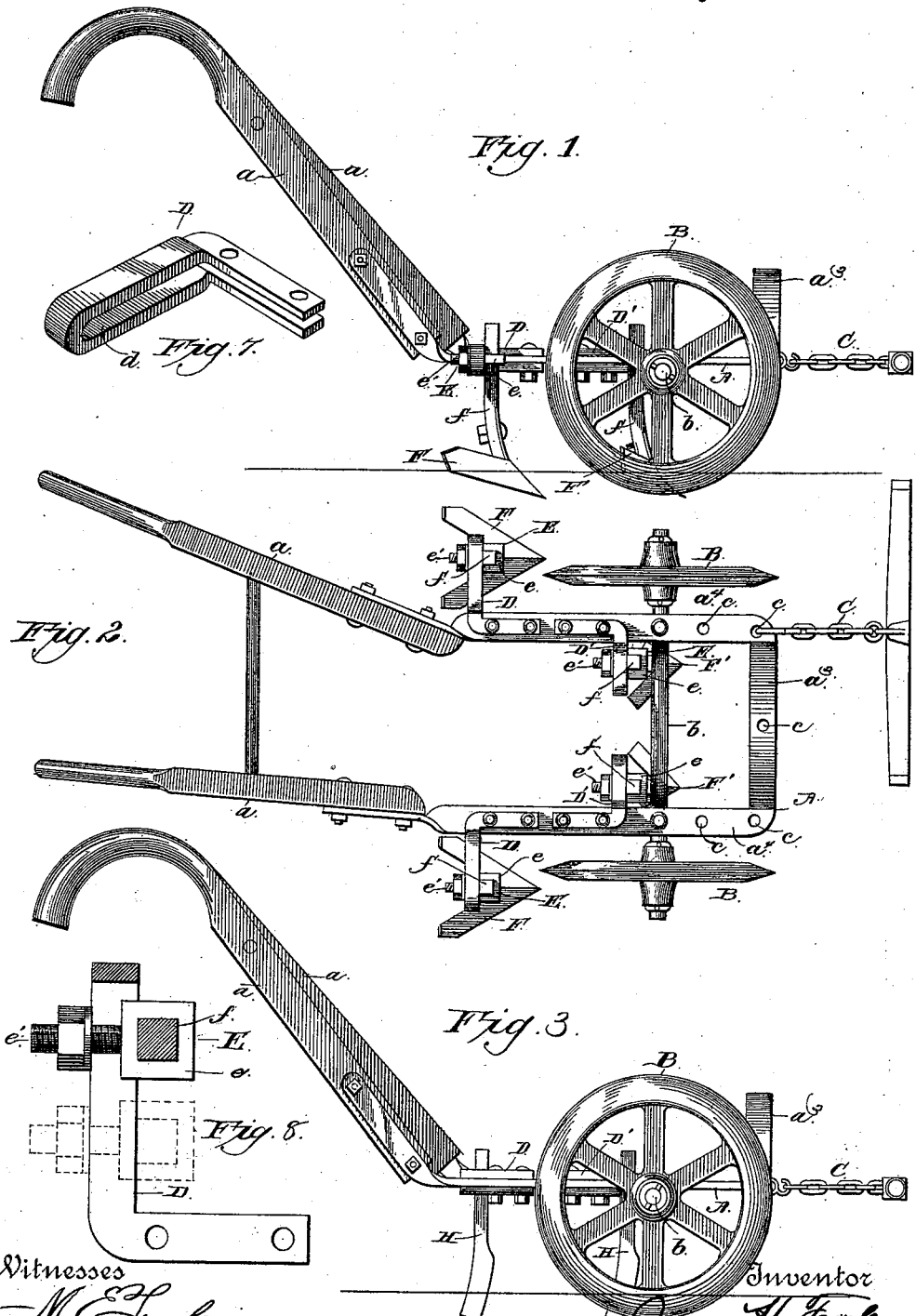

UNITED STATES PATENT OFFICE.

JAMES HENRY FOWLES, OF ORANGEBURG, SOUTH CAROLINA.

CULTIVATOR, HARROW, AND COTTON-CHOPPER.

SPECIFICATION forming part of Letters Patent No. 363,999, dated May 31, 1887.

Application filed February 7, 1887. Serial No. 226,834. (No model.)

*To all whom it may concern:*

Be it known that I, JAMES HENRY FOWLES, a citizen of the United States, residing at Orangeburg, in the county of Orangeburg and State of South Carolina, have invented a new and useful Improvement in Cultivator, Harrow, and Cotton-Chopper, of which the following is a specification.

This invention is an improved combined cultivator, harrow, and cotton-chopper; and it consists in the peculiar construction and combination of devices, that will be more fully set forth hereinafter, and particularly pointed out in the claims.

This invention is an improvement upon the cultivators for which Letters Patent of the United States, No. 328,397, were granted to me October 15, 1885.

In the drawings, Figure 1 is a side elevation of my invention when adapted for use as a cultivator. Fig. 2 is a top plan view of the same. Fig. 3 is a side elevation of my invention when adapted for use as a harrow. Fig. 4 is a top plan view of the same. Fig. 5 is a top plan view of my invention when adapted for use as a cotton-chopper. Fig. 6 is a rear view of the machine when used as a harrow. Fig. 7 is a detail perspective view of one of the interchangeable brackets. Fig. 8 is a sectional view of the same to show the adjustment of the plows or harrow-teeth.

A represents the frame, provided with handles $a$ at its rear end, which incline to the left to enable the operator to walk on one side of the machine, and thereby avoid trampling the row of plants.

The frame A is made of a single piece of iron, with the bowed or arched connecting-pieces $a^3$ at the front, and the parallel side bars, $a^4$, the said parts being constructed of flat bar-iron with the flat side facing uppermost. The ends of the side bars, $a^4$, are twisted so as to assume an edgewise position, and turned laterally and secured to the outer sides of the handles $a$ at the lower or inner ends thereof.

B represents the cultivator-wheels, the peripheries of which are beveled inwardly toward the center to form central sharp beveled edges adapted to enter the soil and steady the movement of the machine. These wheels are loosely mounted upon the axle $b$, which is attached to the frame A.

C represents a chain for attaching the cultivator to a horse or other animal, and the cultivator-frame is provided at its front end with openings $c$, to any one of which the chain may be attached, so that the horse may walk on either side.

Both the operator and the draft-animal walk on one side of the machine to avoid trampling the plants, and all side draft is prevented by the grip of the beveled wheels, which run in the earth.

D and D' represent a pair of right-angular brackets, which are bolted to each side of the cultivator-frame and are removable therefrom. The outer arms of the said brackets project laterally from the sides of the cultivator-frame at right angles thereto, the arms of the brackets D' being shorter than the similar arms of the brackets D.

When the machine is to be used as a cultivator, the brackets are arranged, as shown in Figs. 1 and 2, with the brackets D' in advance of the brackets D, the arms of the brackets D' projecting inwardly from the sides of the cultivator, and the arms of the brackets D projecting outwardly therefrom. The projecting arms of the brackets are spaced apart to provide horizontal slots $d$.

E represents draw-bolts, having rectangular heads $e$ and threaded shanks $e'$, adapted to extend through the slots $d$. Each draw-bolt is provided with a clamping-nut which works on the rear threaded end of the shank.

F and F' represent cultivator-sweeps, which are provided with vertical standards $f$, adapted to enter the rectangular openings made in the heads of the draw-bolts. The said standards are vertically adjustable in the draw-bolts and the latter are laterally adjustable in the slots $d$. When the cultivator-sweeps are arranged at the desired adjustment, they are secured therein by turning the nuts on the draw-bolts, so as to clamp the said draw-bolts and the standards to the brackets and secure them rigidly in place. The sweeps connected to the rear brackets, D, constitute laterally and rearwardly extending blades, which form the sides of an equilateral triangle and are connected to the lower ends of the standards. The sweeps attached to the front brackets are similarly constructed, but are smaller in size and have one blade cut off.

By reference to Figs. 1 and 2 it will be observed that the rear sweep-shovels are arranged in rear of the cultivator-wheels and that the front shovels are arranged directly under the axle. This arrangement is advantageous, for the reason that it causes the front sweeps or blades, which straddle the row of plants, to move concentrically with the cultivator-wheels when the machine is guided by the handle to either side, and prevents the said blades or sweeps from describing arcs of circles of such a radius as to cause them to come in contact with and cut out any of the plants when the machine is turned.

The front sweeps or blades may be arranged so that their angular cutters may either converge or diverge, and thereby cause the earth to be thrown either outwardly from the plants toward the wheels or inwardly toward the row of plants between the blades or sweeps.

When the machine is used as a harrow, the rear brackets, D, are taken from the sides of the cultivator-frame and reversed, so as to cause their slotted arms to project inwardly toward each other. The sweeps are removed from the brackets and harrow-teeth—such as shown at H in Figs. 3 and 4—are substituted therefor, the said harrow-teeth having their lower cutting ends bent rearwardly. This rearward slant of the teeth is steadily maintained by the beveled wheels, whose course they follow. Care should be exercised in attaching the harrow-teeth to the arms of the brackets, to prevent the teeth from being in line with each other. When thus equipped, the machine is adapted to run directly along the seed furrow or row and astride of the same, before or after the plants appear above the ground, the teeth serving to break the crust formed by rains, and thus thoroughly loosening the soil and preventing grass and weeds from starting and injuring the plants by retarding their growth and impairing their vitality. The stand is not injured, owing to the sharp cutting-edge and rearward slant of the teeth, which do not cut out the plants.

In Fig. 5 I illustrate my machine adapted for use as a cotton-chopper. The harrow-teeth, the front brackets, D', and the front sweeps or blades are discarded in this instance, and the rear sweeps are attached to the brackets D and caused to run directly in rear of the cultivator-wheels, or they may be adjusted laterally toward or from each other, according to the width it is desired to obtain between the hills of growing plants. The machine thus equipped is run transversely across the rows of plants, cutting out two spaces at each passage. It is guided steadily by means of the beveled wheels, and the depth of the cut is easily regulated in crossing the beds or rows by lowering or raising the handles. The horse walks in front and the man walks behind the left-hand sweep, so that the hills which are left by the sweeps are not trampled.

Having thus described my invention, I claim—

1. A cultivator-frame composed of the side bars, $a^4$, the bowed connecting-bar $a^3$, all in a single piece, the ends of the side bars being twisted and turned edgewise laterally to one side, and the handles secured to said ends of the side bars, so as to be inclined to one side, as set forth.

2. In combination with the cultivator-frame, the axle, and the supporting-wheels, the attaching-brackets secured to the frame, and the shovels carried by the attaching-brackets, the front shovels being arranged directly under the axles and the rear shovels being arranged in rear of the cultivator-wheels, the said wheels having the peripheral circular cutting-edges and arranged on a line parallel with and intermediately between the front and rear shovels, for the purpose set forth.

3. In combination with the cultivator-frame, the interchangeable slotted angle-brackets secured to the frame, the side bars of the frame passing through the slots of the angle-brackets, and the implements attached to the projecting arms of the brackets, as set forth.

4. In combination with the cultivator-frame, the axle and the supporting-wheels, interchangeably-slotted attaching-brackets secured to the frame, and the shovels carried by the attaching-brackets, the front shovels being arranged directly under the axles, the shovels being laterally adjustable in the brackets, for the purpose set forth.

In testimony that I claim the foregoing as my own I have hereto affixed my signature in presence of two witnesses.

JAMES HENRY FOWLES.

Witnesses:
 B. W. ANDREWS,
 JAMES S. HEYWARD.